(12) United States Patent
Weng et al.

(10) Patent No.: US 8,766,492 B2
(45) Date of Patent: Jul. 1, 2014

(54) HOT PLUG CONNECTOR AND SERVER USING THE SAME

(75) Inventors: Cheng-Fei Weng, Shenzhen (CN); Zheng-Heng Sun, Tu-Cheng (TW)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 535 days.

(21) Appl. No.: 13/075,209

(22) Filed: Mar. 30, 2011

(65) Prior Publication Data

US 2012/0162898 A1    Jun. 28, 2012

(30) Foreign Application Priority Data

Dec. 24, 2010 (CN) .......................... 2010 1 0605159

(51) Int. Cl.
*H05K 7/00* (2006.01)
*H05K 5/00* (2006.01)

(52) U.S. Cl.
USPC ...................................... 307/149; 361/679.33

(58) Field of Classification Search
None
See application file for complete search history.

(56) References Cited

U.S. PATENT DOCUMENTS

| | | | |
|---|---|---|---|
| 2006/0276083 A1* | 12/2006 | Sun ................................ | 439/638 |
| 2010/0265650 A1* | 10/2010 | Chen et al. ................ | 361/679.33 |
| 2011/0246794 A1* | 10/2011 | Liao .............................. | 713/300 |

* cited by examiner

*Primary Examiner* — Jared Fureman
*Assistant Examiner* — Aqeel Bukhari
(74) *Attorney, Agent, or Firm* — Novak Druce Connolly Bove + Quigg LLP

(57) ABSTRACT

A hot plug connector, for hot plugging of a hard disk drive in a system, includes a main body and electric cables. The main body includes a power interface. The electric cables connect the power interface of the main body with a power supply. The power interface is configured for connecting to the hard disk drive.

7 Claims, 5 Drawing Sheets

HOT PLUG CONNECTOR AND SERVER USING THE SAME

BACKGROUND

1. Technical Field

The present disclosure generally relates to connectors, and particularly to a hot plug connector and a server using the same.

2. Description of Related Art

As computer hardware and software technology continues to progress, the need for larger and faster mass storage devices for storing data continues to increase. When a storage device in a server is about to run out of memory, additional hard disk drives can be added. However, with current technology hot plugging of the additional disk drives may damage the drives.

Therefore, there is room for improvement in the art.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure.

DETAILED DESCRIPTION

Reference will now be made to the drawings to describe the present hot plug connector in detail.

Figure 1:
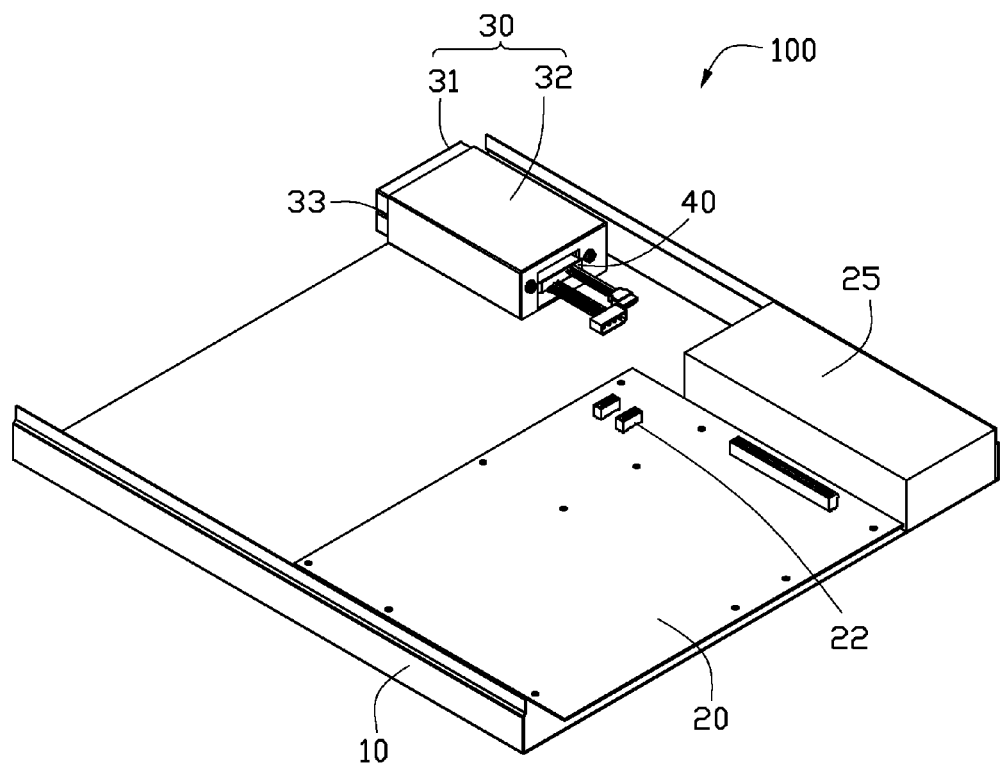
FIG. 1 is a schematic view of a server equipped with a hot plug connector in accordance with an exemplary embodiment of the present disclosure.

Referring to FIG. 1, a server 100, according to an exemplary embodiment, includes a circuit board 20, a power supply 25, a hard disk drive unit 30, and a plurality of hot plug connectors 40 arranged in a chassis 10.

Figure 2:
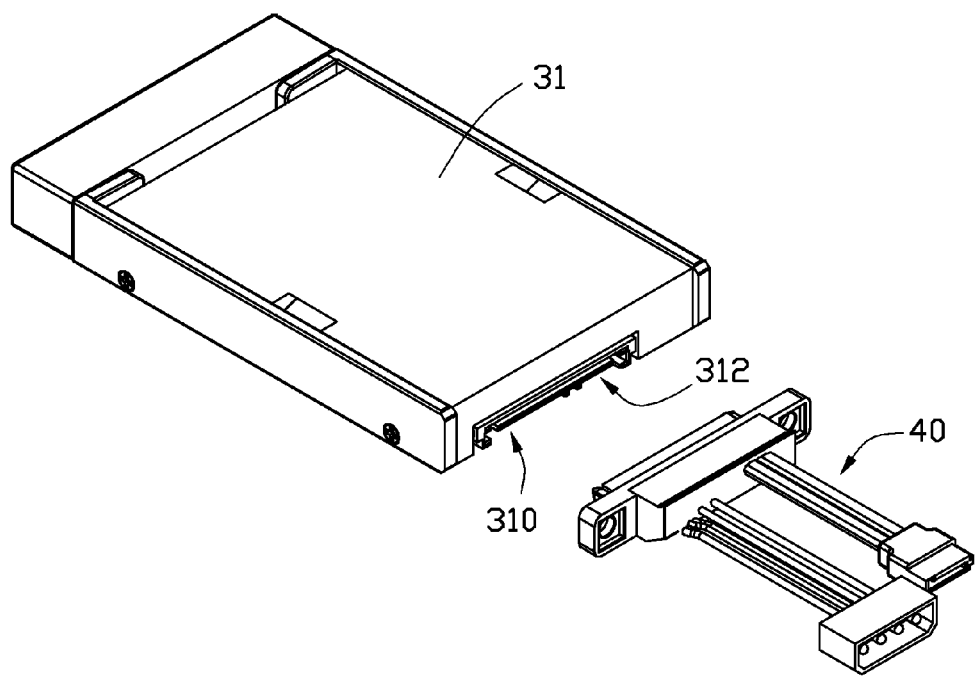
FIG. 2 is a schematic view of the hard disk drive and the hot plug connector of the server of FIG. 1.

The hard disk drive unit 30 includes a box-shaped housing 32 and a plurality of hard disk drives 31 arranged in the housing 32. The housing 32 is configured for receiving and supporting the hard disk drives 31. The housing 32 is fixed at a front portion of the chassis 10 and includes an opening 33 facing toward a front side of the chassis 10. As such, the hard disk drives 31 can be plugged/unplugged into/from the housing 32 via the opening 33. The hard disk drives 31 can be serial advance technology attachment (SATA) hard disk drives. Each hard disk drive 31 includes a power interface 310 and a data interface 312 as illustrated in FIG. 2. The power interface and data interface of the hard disk drive 31 each include a plurality of pins. In this embodiment, the power interfaces of the hard disk drives 31 are 15 pin power interfaces.

The circuit board 20 is arranged at a bottom portion of the chassis 10. The circuit board 20 includes a plurality of data connectors 22 for connecting with the data interfaces of the hard disk drives 31.

The power supply 25 includes a plurality of power interfaces (not illustrated) for connecting with those of the hard disk drives 31. The power supply 25 includes a first power supply unit 251 and a second power supply unit 252 (see FIG. 5). The first power supply unit 251 and the second power supply unit 252 each provide a voltage with a value different from each other. The different value of voltages of the first and second power supply units 251, 252 are respectively for hard disks with different power consuming standards.

Figure 3:
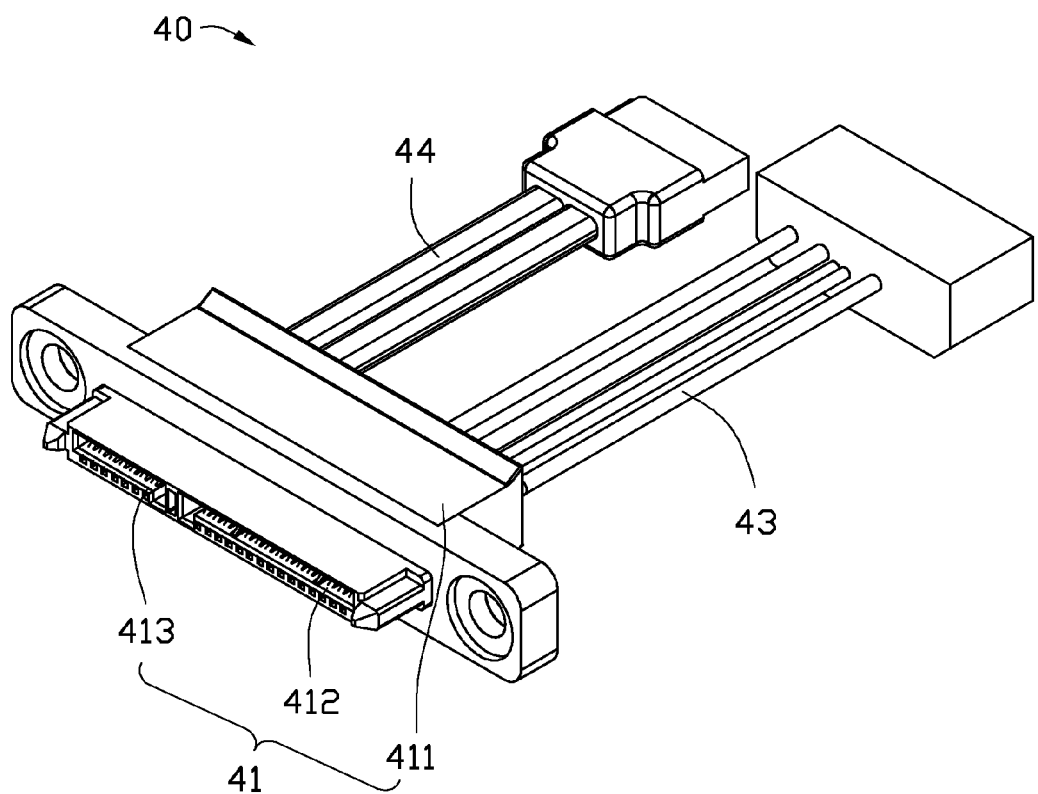
FIG. 3 is a schematic view of the hot plug connector of FIG. 1.
Figure 4:
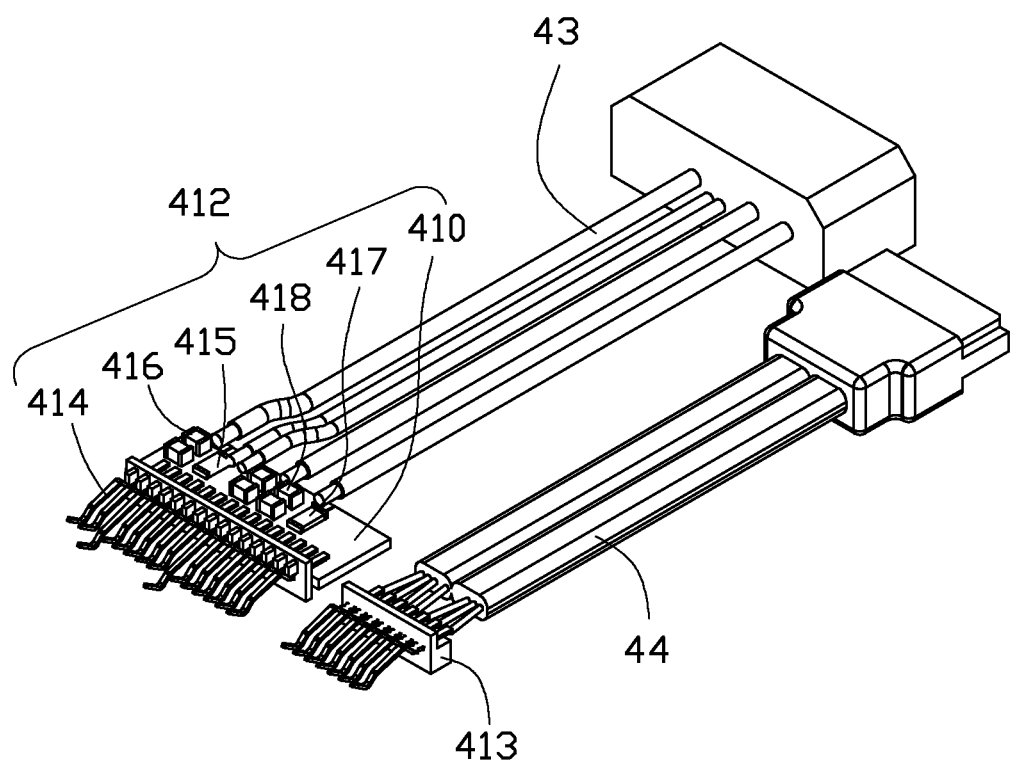
FIG. 4 is a schematic view of an internal configuration of the hot plug connector of FIG. 1.

The hot plug connectors 40 are arranged at a rear side of the housing 32. Referring to FIG. 3 and FIG. 4, each hot plug connector 40 includes a main body 41, a plurality of power cables 43, and data cables 44. The main body 41 includes a rectangular case 411, with both a power interface 412 and a data interface 413 configured in the case 411.

The power interface 412 is configured for connecting with one of the power interfaces of the hard disk drives 31 via the power cables 43. The power interface 412 includes a planar plate 410, and a circuit with hot plug function configured on the planar plate 410. The circuit with hot plug function includes a plurality of resistors, a plurality of capacitors, a plurality of pins 414 extending outwardly from a lateral side of the planar plate 410, and a plurality of electric traces configured on the planar plate 410. The plurality of pins 414 respectively corresponds to the pins of the power interface of the hard disk drive 31. In this embodiment, there are fifteen of the pins 414, the resistors include a first resistor 415 and a second resistor 417, and the capacitors include two first capacitors 416 and four second capacitors 418.

The data interfaces 413 are configured to connect to the data interfaces of the hard disk drives 31, and further connect to the data connectors 22 of the circuit board 20 via the data cables 44.

Figure 5:
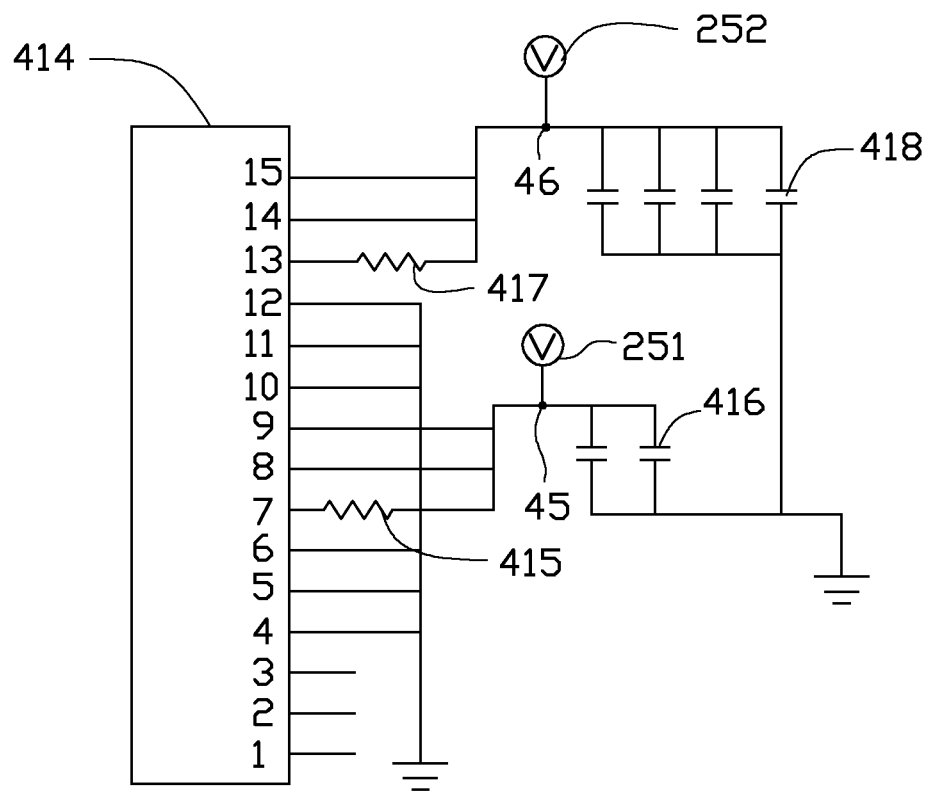
FIG. 5 is a schematic circuit diagram of the hot plug connector of FIG. 1.

Referring to FIG. 5, a schematic circuit diagram of the hot plug connector 40 is illustrated. The first, second and third pins of the power interface 412 are floating pins. The fourth, fifth, sixth, tenth, eleventh and twelfth pins of the power interface 412 are grounded pins. The seventh, eighth and ninth pins of the power interface 412 are first power pins. The thirteenth, fourteenth, and fifteenth pins of the power interface 412 are second power pins.

The two first capacitors 416 are connected together in parallel, with one terminal connected to the ground and the other terminal defining a first node 45. The first node 45 is connected to the seventh pin of the power interface 412 by the first resistor 415. The first node 45 is also directly connected to the eighth and ninth pins of the power interface 412.

The four second capacitors 418 are connected together in parallel, with one terminal connected to ground and the other terminal defining a second node 46. The second node 46 is connected to the thirteenth pin of the power interface 412 by the second resistor 417. The second node 46 is also directly connected to the fourth and fifth pins of the power interface 412.

When the hot plug connector 40 is connected to the power supply 25 by the power cables 43, the first power pins of the power interface 412 are connected to the first power supply unit 251, the second power pins of the power interface 412 are connected to the second power supply unit 252. In this embodiment, the first power supply unit 251 has a predetermined output value of 5 volts, and the second power supply unit 252 has a predetermined output value of 12 volts.

When the hard disk drive 31 is installed in the server 100, the power interface of the hard disk drive 31 is connected to the power interface 412 of the hot plug connector 40, the data interface of the hard disk drive 31 is connected to the data interface 413 of the hot plug connector 40, the power cables 43 of the hot plug connector 40 are connected to the power supply 25, and the data cables 44 of the hot plug connector 40 are connected to the data connectors 22. During both read and write operations, one or more magnetic head(s) of the hard disk drive 31 moves across a disk surface to a target sector where data has been (or will be) written. After read and write operations, the magnetic head(s) of the hard disk drive 31 moves back to an initial position.

The seventh and thirteenth pins of the power interface 412 are longer than the other power pins.

When the hard disk drive 31 is plugged into the hot plug connector 40 of the running server 100, the longer seventh and thirteenth pins are the first pins to contact the power interface of the hard disk 31. At this time, the power supply 25 charges the first capacitors 416 (or the second capacitors 418) and supplies power to the hard disk drive 31 via the seventh (or thirteenth) pin. When fully plugged into the hot plug connector 40, the hard disk drive 31 has its data interface connected with the data interface 413 of the hot plug connector 40. As such, the hard disk drive 31 is capable of working in normal status. Due to the seventh (or thirteenth) pin being connected to the power supply 25 before the other power pins during hot plug operation, a start-up time of the hard disk drive 31 is extended. Further, during the moment the power supply 25 starts supplying power to the hard disk drive 31 via the seventh (or thirteenth) pin, and because the first capacitors 416 (or the second capacitors 418) are charged beforehand, short-circuiting of the hard disk drive is safely avoided. Still further, the first resistor 415 (or the second resistor 417) can also perform current limiting function during operation of the power supply 25.

When the hard disk drive 31 is unplugged from the hot plug connector 40 of the running server 100, the eighth, ninth, fourteenth, and fifteenth pins of the power interface 412, being shorter than the seventh and thirteenth pins, break contact first. Thus the hard disk drive 31 can interrupt read and write operations and force the magnetic head back to an initial position, before the seventh and thirteenth pins separate from the power interface of the hard disk 31, at which time the first capacitors 416 (or the second capacitors 418) discharges and provide power to the hard disk 31 to help the magnetic head return to the initial position without power from the power supply 25.

Therefore, safe hot plugging and unplugging of the hard disk drives 31 can be performed with the help of the hot plug connectors 40. In other embodiments, the number of hot plug connectors 40 can vary according to an actual amount of desired hard disk drives 31.

It is to be understood that the above-described embodiments are intended to illustrate rather than limit the disclosure. Variations may be made to the embodiments without departing from the spirit of the disclosure as claimed. The above-described embodiments illustrate the scope of the disclosure but do not restrict the scope of the disclosure.

What is claimed is:

1. A server, comprising:
   a chassis;
   a plurality of hard disk drives received in the chassis, the hard disk drives each comprising a power interface;
   a power supply placed in the chassis; and
   a plurality of hot plug connectors each comprising a main body and electric cables, the main body being equipped with a power interface for connecting with the power interface of a corresponding hard disk drive, the electric cables electrically connecting the power interface of the main body to the power supply;
   wherein the power interface of the hot plug connector comprises a plate with a hot plug circuit configured thereon, the hot plug circuit comprises a plurality of pins, a plurality of first capacitors and a plurality of second capacitors, the plurality of pins extends from a lateral side of the plate and is divided into first power pins, second power pins and grounded pins, the plurality of first capacitors are arranged on the plate and electrically connected in parallel between the first power pins and the grounded pins, and one of the first power pins is longer than the other first power pins.

2. The server according to claim 1, wherein the plurality of second capacitors are arranged on the plate and electrically connected in parallel between the second power pins and the grounded pins, and one of the second power pins is longer than the other second power pins.

3. The server according to claim 2, wherein the hot plug circuit further comprises a first resistor and a second resistor both arranged on the plate, the first resistor is connected between the longer first power pin and the first capacitors connected in parallel, and the second resistor is connected between the longer second power pin and the second capacitors connected in parallel.

4. The server according to claim 2, wherein the power supply comprises a first power supply unit and a second power supply unit, the first power pins are connected to the first power supply unit, the second power pins are connected to the second power supply unit, the first power supply unit and the second power supply unit each provide a voltage with a value, the two values are different from each other, and the different values of the voltages of the first and second power supply units are respectively for hard disks with different power requirements.

5. The server according to claim 1, further comprising a circuit board and a plurality of data connectors on the circuit board, wherein each of the hard disk drives further comprises a data interface, the main body of each of the hot plug connectors further comprises a data interface, and each of the hot plug connectors further comprises data cables for connecting the data interface of the main body with the data connectors on the circuit board.

6. The server according to claim 1, further comprising a housing for supporting and receiving the hard disk drives, wherein the housing comprises an opening defined at a front side thereof via which the hard disk drives can be plugged into and unplugged from the housing, and the hot plug connectors are arranged at a rear side of the housing.

7. The server according to claim 6, wherein the power interfaces of the hard disk drives are plugged into the power interfaces of the hot plug connectors while the hard disk drives are plugged into the housing.

* * * * *